H. H. PACKER.
Ratchet Drill.
No. 2,140.
Reissued Jan'y 2, 1866.
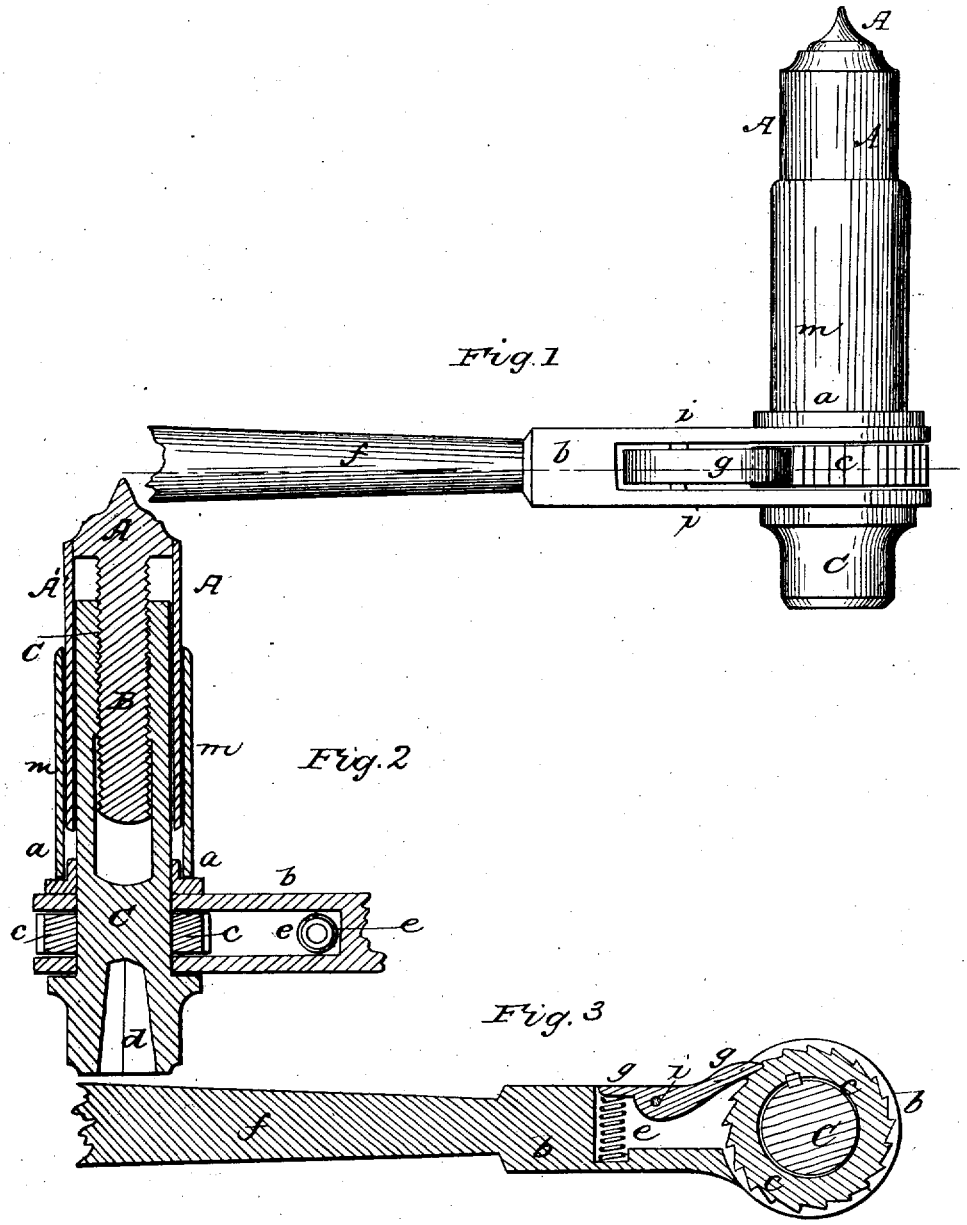
N. PETERS, Photo-Lithographer, Washington, D. C.

UNITED STATES PATENT OFFICE.

HENRY H. PACKER, OF BOSTON, MASSACHUSETTS.

IMPROVEMENT IN DRILLS.

Specification forming part of Letters Patent No. 20,728, dated June 29, 1858; Reissue No. 2,140, dated January 2, 1866.

*To all whom it may concern:*

Be it known that I, HENRY H. PACKER, of Boston, in the county of Suffolk and State of Massachusetts, have invented a new and useful Hand Ratchet-Drill Machine, for the purpose of drilling or boring holes in metallic or other substances in the process of constructing and erecting machinery, and for other mechanical purposes where it is not convenient to use the power-drill machine; and I do hereby declare that the following is a full, clear, and exact description of the construction and operation of the same, reference being had to the accompanying drawings, making a part of this specification.

Hand ratchet-drills have been constructed previous to my invention with a drill-stock, feed-screw turning in a feed-nut ratchet-wheel, and lever-handle carrying a pawl to act upon the ratchet-wheel, in such manner that dust and dirt have free access to the feed-screw. Such dirt accumulating in the threads of the screw greatly increases the friction, and causes the feed-screw and the feed-nut or hollow screw, in which it turns, to wear rapidly, so that the instrument becomes practically useless, by the wearing out of the feed-screw or the feed-nut or hollow-screw before the remainder of the instrument is worn out.

The object of my invention is to obviate this defect in these instruments by protecting the feed-screw; and my invention consists of two combinations of the old members of the ratchet-drill with additional instrumentalities, whose office is to protect the feed-screw from dirt.

To enable those skilled in the art to make and use my invention, I will proceed to describe the construction and operation of an improved ratchet-drill constructed in the best manner known to me, referring by letter to the accompanying drawings, in which—

Figure 1 represents an elevation of my improved drill. Fig. 2 represents a vertical section through the center thereof, and Fig. 3 represents a horizontal section at the line *x x* of Fig. 1.

Similar letters denote the same parts in the different views.

C represents the drill-stock, the upper end of which is bored out and tapped to form the hollow screw or feed-nut C′, in which the feed-screw B is received, and the lower end is constructed with a socket, *d*, Fig. 2, for the reception of the shank of this drill, that is to be used with the instrument. The head of the feed-screw B is conical on top, as seen at A, so as to form a pivot, and it has projecting from its perimeter downward a shell, A′, which, when the screw B is screwed farthest into the feed-nut of the drill-stock C, surrounds the upper part or feed-nut of said drill-stock. A ratchet-wheel, *c*, is keyed onto the lower end of the drill-stock C, and a pawl-carrier, *b*, is fitted upon the drill-stock, and is provided with a spring-pawl, *g*, to engage with the teeth of the ratchet-wheel, the pawl-carrier being forked to embrace the ratchet-wheel, and the pawl *g* working on a pivot, *i*, and being pressed against the teeth of said ratchet-wheel by a spiral spring, *e*. The pawl-carrier *b* is furnished with a suitable handle, *f*, by which it can be moved to and fro. Hence, when the handle *f* is moved in one direction, the pawl *g*, engaging with one of the teeth of the ratchet-wheel, compels it and the drill-stock to which it is keyed to turn, and when the handle is moved in the opposite direction the pawl *g* glides over the teeth of the ratchet-wheel without moving it and the drill-stock. The drill carried by the drill-stock is thus alternately turned (more or less, according to the stroke of the handle) to cut the material upon which it acts and left stationary. The instrument is borne against the material in the usual manner by supporting the pivot-head A of the feed-screw by an abutment, and the feed-screw B is turned, as required, to feed the drill by a key or lever applied to a hole in its head A. As the screw turns out of the feed-nut C′ of the drill-stock in feeding, the shell A′ covers the part of the screw which is out of the feed-nut C′ and protects it from dirt. As a further protection against dirt, I have combined with the instrument a second or exterior shell, *m*, which is applied over the first or inner shell, A′, and is secured to the collar *a*, that surrounds the drill-stock. The two shells effectually protect the feed-screw from dirt or other injurious matter.

Having thus described a ratchet drill embodying my invention, I declare that I do not claim the invention of the drill-stock, the feed-nut, the feed-screw, or the ratchet-wheel and vibrating pawl-carrier; nor do I claim the invention of a tubular case or shell when separated from the ratchet-drill; but

What I claim as my invention, and desire to secure by Letters Patent, is—

1. The combination, in a ratchet-drill, of the following instrumentalities, viz: the drill-stock, feed-nut, feed-screw, shell, ratchet-wheel, and pawl-carrier, substantially as set forth.

2. The combination, in a ratchet-drill, of the following instrumentalities, viz: the drill-stock, feed-nut, feed-screw, exterior and inner shells, ratchet-wheel, and pawl-carrier, substantially as set forth.

In witness whereof I have hereunto set my hand this 28th day of August, A. D. 1865.

HENRY H. PACKER.

Witnesses:

CHARLES C. DAME,
JOHN B. O'BRIEN.